United States Patent [19]

Braatz

[11] Patent Number: 4,575,043

[45] Date of Patent: Mar. 11, 1986

[54] NEEDLE VALVE

[75] Inventor: Robert E. Braatz, Sun Prairie, Wis.

[73] Assignee: The BOC Group, Inc., Montvale, N.J.

[21] Appl. No.: 699,490

[22] Filed: Feb. 8, 1985

Related U.S. Application Data

[63] Continuation of Ser. No. 539,362, Oct. 6, 1983, abandoned.

[51] Int. Cl.$^4$ ............................................. F16K 47/00
[52] U.S. Cl. .................................... 251/122; 74/441; 251/903
[58] Field of Search ............... 251/118, 122, 227, 240, 251/245, 246, 337, DIG. 4; 74/441, 424, 8 VA, 89, 15, 8 R

[56] References Cited

U.S. PATENT DOCUMENTS

| 903,114 | 11/1908 | Snell | 251/227 |
| 1,988,819 | 1/1935 | Stuart | 251/122 |
| 2,607,826 | 8/1952 | Barnes | 74/441 |
| 3,084,865 | 4/1963 | Fleer et al. | 251/122 |
| 4,099,703 | 7/1978 | Lush | 251/122 |

FOREIGN PATENT DOCUMENTS 2323206 11/1973 Fed. Rep. of Germany ...... 251/122

Primary Examiner—Samuel Scott
Assistant Examiner—Noah Kamen
Attorney, Agent, or Firm—Roger M. Rathbun; Larry R. Cassett

[57] ABSTRACT

A needle valve having improved accuracy and wear characteristics is disclosed in which the valve stem is subjected to a constant force to prevent backlash throughout its entire movement with respect to the valve seat. In addition, the needle contained within the valve stem has a tapered end which moves within the cylindrical bore in a valve seat to control fluid passing through the valve and such needle is affixed to the valve stem only at its other end remote from its tapered end. The needle thus floats for a substantial portion of its length and its tapered end is relatively flexible and free of movement. The needle is, however, angled with respect to its valve seat such that the needle physically makes contact with the internal surface of the valve seat and maintains that contact throughout its lateral movement within the valve seat.

2 Claims, 3 Drawing Figures

NEEDLE VALVE

This application is a continuation of U.S. Ser. No. 539,362 filed Oct. 6, 1983 now abandoned.

BACKGROUND OF THE INVENTION

This invention relates to flow control valves and, more particularly, to a needle valve used to control precise flow of a gas passing therethrough.

Needle valves are, of course, used in a wide variety of applications where precision is needed in varying flow over a particular range. The valves comprise a valve seat having a finely designed cylindrical bore and a tapered needle that moves within that cylindrical opening to vary the effective opening size and thus control the flow of gas through that opening. The movement of the needle is generally controlled by turning a valve stem which supports the needle and which is fitted into a housing with an appropriate threaded engagement.

One characteristic feature of such valves is a means to prevent backlash or movement of the valve stem with respect to its threaded housing as a result of play or clearance between the threads. Normally, a force is applied to maintain the threads of the valve stem against the corresponding threads of the housing, however, such force is applied in a non-uniform manner. That is, when the conventional needle valve is in its fully open position, i.e., the needle is as retracted from the cylindrical bore in its valve seat as is possible, there still must be a force on the valve stem holding it firmly against the respective threads. As the needle valve is then moved toward its closed position, that force is generally increased due to the means of applying the force, and thus such actual force increases to a high value that is really not necessary, causing unnecessary wear to the threads and shortening valve life.

Conventional valves further affix the needle itself to the valve stem such that the tapered end is held firmly in position with respect to the valve stem and, as a result, also with respect to the cylindrical opening in the valve seat. Accordingly, the tapered end, when rotated, will move not only laterally as is expected, but will also have some radial movement resulting from any eccentricities in the valve stem. The tapered end movement is therefore not precise within the valve seat and may vary in needle valves due to differences in manufacturing limitations.

SUMMARY OF THE INVENTION

The overall needle valve thus provides for a highly accurate unit and which is reproducible by manufacturing with predictable results. In addition, since less force needs to be applied to the valve stem because it is maintained constant throughout valve movement, less wear is experienced to the threads of the valve stem.

The foregoing and other advantages and features of the present invention will become readily apparent from the following description.

BRIEF DESCRIPTION OF THE DRAWINGS

The invention is diagrammatically illustrated by way of example in the drawings appended hereto, in which.

DESCRIPTION OF THE PREFERRED EMBODIMENT

Figure 1:
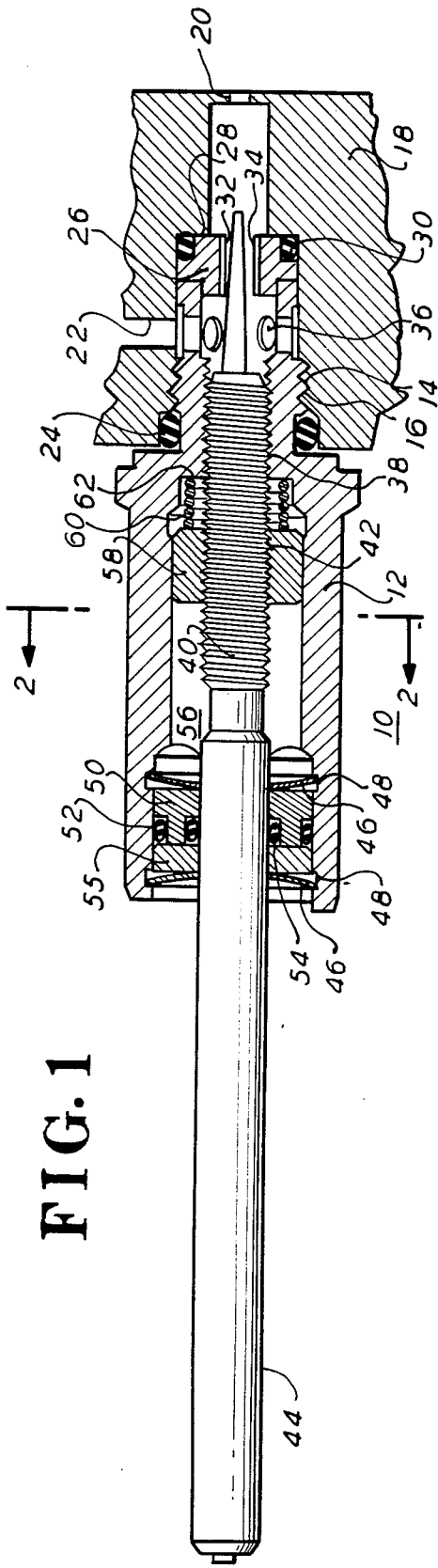
FIG. 1 is a side view, partly in cross section, of a needle valve constructed in accordance with the present invention.

In FIG. 1 there is shown a side view, partly in cross section, of a needle valve 10 constructed in accordance with the present invention. The needle valve 10 comprises a housing 12 and which has external threads 14 at its forward end for engagement with suitable internal threads 16 formed in a valve block 18. It should be noted that the valve block 18 can be a manifold or other gas directing device into which a needle valve may be mounted to control a gas.

The valve block 18 has formed therein, an inlet 20 through which gas is provided to the needle valve 10 and has an outlet 22 that channels the gas leaving needle valve 10 for some utilization. As shown, the needle valve 10 is preferably screwed into the valve block 18 and an o-ring 24 prevents leakage of gas therebetween.

A valve seat 26 is secured within valve block 18 by abutting against a shoulder 28 formed in valve block 18. The valve seat 26 has an o-ring 30 for sealing against the inside surface of valve block 18 and has a cylindrical bore 32 which is of uniform radius and which is preferably formed by a silver insert 34 affixed to the valve seat 26.

The cylindrical bore 32 forms the inlet means of needle valve 10 and an outlet means is provided by means of holes 36 through which the gas passes to outlet 22 of the valve block 18.

Within housing 12, there are formed, a set of internal threads 38 into which, as shown, a valve stem 40 is threadedly engaged having corresponding external threads 42. The distal end 44 of valve stem 40 is smooth and may have a knob (not shown) affixed thereto for ease in rotating valve stem 40.

The valve stem 40 is sealed as it passes through housing 12 by means of a pair of springs 46 which are fitted into recesses 48 in the internal surface of the housing 12 and sandwich therebetween a retainer 50 on to which are fitted o-rings 52 and 54 to seal against leakage along valve stem 40 and bearing 55 to support the same.

Figure 2:
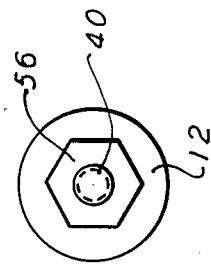
FIG. 2 is a cross-sectional view of the needle valve of FIG. 1 taken along the lines 2—2.

An internal cavity 56 within housing 12 is formed by a hexagonal broach and a hex nut 58 rides therein. The hex nut 58 has the same threads as the external threads 42 of valve stem 40 and fits within internal cavity 56 such that hex nut 58 cannot turn (See FIG. 2).

A bias is constantly exerted against valve stem 40 by means of spring 60 which has one end thereof held in the housing 12 at shoulder 62 formed within internal cavity 56 and the other end thereof exerting a force against the hex nut 58 to maintain the bias as will be explained later when the assembly of the needle valve 10 is described.

Figure 3:
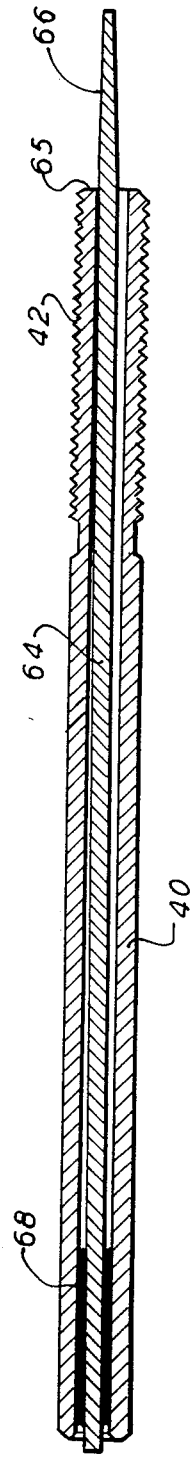
FIG. 3 is a cross-sectional view of a valve stem used in the construction of FIG. 1.

Turning now to FIG. 3, there is shown a cross-sectional view of the valve stem 40 used in the needle valve 10 of the present invention. As shown, within the valve stem 40 is a needle 64 having a tapered end 66 and having its other or distal end secured to the valve stem 40 by means such as solder 68. The needle 64 is soldered in an angled position within valve stem 40 such that it contacts the edge of opening 65 of valve stem 40 as the needle 64 emerges therefrom.

Returning again to FIG. 1, the constant force exerted upon valve stem 40 can best be exemplified by describing the assembly of certain parts of the needle valve 10.

Assembly of the valve stem 40 takes place prior, of course, to the assembly of springs 46, retainer 50 and bearing 55 such that the distal end of the housing 12 is open. Spring 60 is first placed within internal cavity 56 and abuts shoulder 62. Next, hex nut 58 is inserted within internal cavity 56 which, as explained, is hexagonal shaped about the same size as hex nut 58 such that hex nut 58 cannot rotate within internal cavity 56 but it can move laterally. The valve stem 40 is then inserted into internal cavity 56 and is rotated such that its external threads 42 engage corresponding threads of the hex nut 58 for a predetermined number of turns. After those predetermined turns have been completed and valve stem 40 is sufficiently engaged within hex nut 58, a force is exerted against the distal end 44 of valve stem 40 causing the hex nut 58 to engage spring 60 and compress the spring 60 a predetermined amount. Preferably the spring 60 is selected such that a force of approximately 3 lbs. causes sufficient compression for purposes of this invention. That force is maintained while the valve stem 40 is again rotated so that its external threads 42 now engage the internal threads 38 of housing 12. Once the valve stem 40 is sufficiently threadedly engaged to the internal threads 38, the spring compression is fixed and likewise, the force exerted by the spring bias acting on valve stem 40 is fixed.

The distal end of housing 12 is thereupon closed and support provided for valve stem 40 by inserting one of the springs 46 within its recess 48. The retainer 50 is placed into housing 12 and surrounds the valve stem 40. The o-rings 52 and 54 are fitted onto retainer 50 to provide sealing along the interior of the housing 12 and along the valve stem 40. The bearing 55 is thereupon slipped along the distal end 44 and is held in place within housing 12 by the other spring 46 fitted within its recess 48.

The valve stem 40 thus can continue to be rotated until the tapered end 66 of needle 64 is operatively associated with valve seat 26 and valve stem 40 rotated to move the tapered end 66 of needle 64 with respect to valve seat 26 to open or close the opening through which the gas passes and thus control its flow. Yet the force exerted by spring 64 continues to exert a constant force upon valve stem 40. It should also be noted that the tapered end 66 of needle 64 contacts, at all times, the valve seat 26 and continues to maintain that contact even when valve stem 40 is withdrawn to its fully operative open position. Thus, the angled pitch of the needle 64 retains contact between the needle 64 and valve seat 26 such that the shape of the opening therebetween is not changed in overall configuration even though changed in area as the valve stem 40 is moved to open or close needle valve 10. The flow characteristics are thereby kept more constant than if the needle were to move its position around the inside of its valve seat.

While the present invention has been set forth in terms of a specific embodiment, it will be understood that the needle valve herein disclosed may be modified or altered by those skilled in the art to other configurations. Accordingly, the invention is to be broadly construed and limited only by the scope and spirit of the claims appended hereto.

I claim:

1. A needle valve comprising a housing having an inlet means, and outlet means and a flow path formed there between, a cylindrical valve seat in said flow path, a hollow valve stem threadedly engaged with said housing and moveable coaxially toward and away from said cylindrical valve seat, said hollow valve stem having its end remote from said cylindrical valve seat closed and its end near said cylindrical valve seat open, a tapered needle affixed within said hollow valve stem by having one end secured to said closed end of said hollow valve stem and having its free end extending outwardly from said open end of said hollow valve stem and having its main axis at an angle to the main axis of said hollow valve stem, said needle adapted to enter and withdraw from said cylindrical valve seat as said hollow valve stem moves toward and away therefrom to decrease and increase, respectively, the flow through said needle valve, said needle physically touching the inner surface of said cylindrical valve seat throughout its movement therein.

2. A needle valve as defined in claim 1, wherein said needle is in contact with said open end of said hollow valve stem as it extends therefrom.

* * * * *